Jan. 26, 1943.  W. NOBLE  2,309,208
ELECTRIC WELDING
Filed April 16, 1941
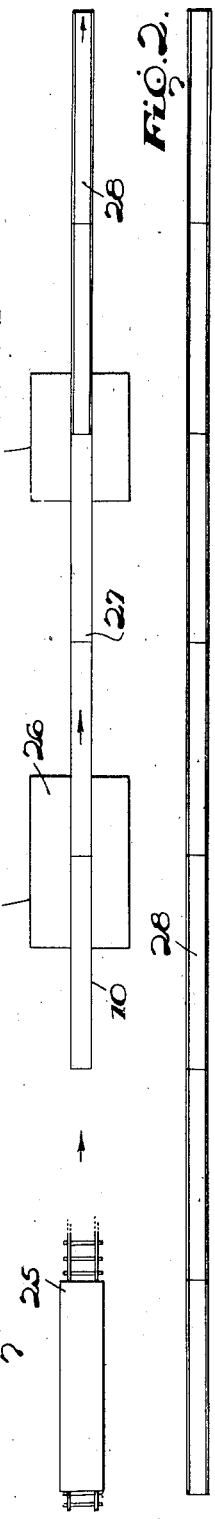
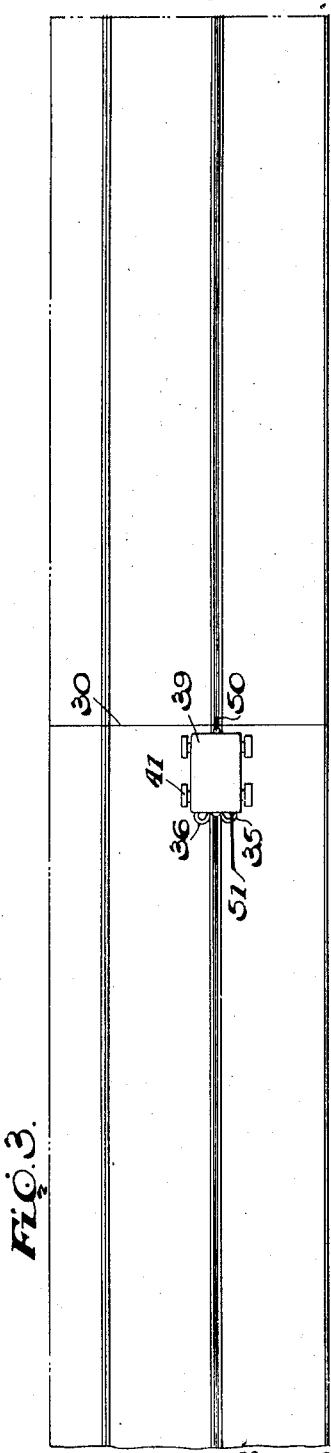
Inventor
Warren Noble.

Patented Jan. 26, 1943

2,309,208

UNITED STATES PATENT OFFICE 2,309,208

ELECTRIC WELDING

Warren Noble, Washington, D. C.

Application April 16, 1941, Serial No. 388,853

5 Claims. (Cl. 219—10)

The present invention relates to methods of electric welding, and metal sheets, plates, tubes, structural elements and the like, having novel features of construction adapted to facilitate electric welding operations in accordance with the new methods. The articles are so shaped that they may be joined by electric welding in a simplified and expeditious manner to similar articles.

It is an object of the invention to provide a method of butt-welding articles together, without the necessity of operating upon the inner and outer, or lower and upper, surfaces of the articles. A further object is to provide a method, wherein plates and similar articles may be butt-welded by the application of welding current and of welding pressure to the upper or outer surfaces of the articles only. A further object of the invention is to provide a method wherein the localized area of welding is initiated at one of the surfaces of the articles and moves progressively transversely across the edge faces toward the other surfaces, and wherein the area of welding is simultaneously moved longitudinally of the edge faces of the articles to produce a continuously welded seam. A further object of the invention is to eliminate the incipient line of weakness or crack usually formed in butt-welded joints on the surface opposite to that upon which the welding current is applied.

A further object of the invention is to provide novel edge face and surface shapes on the articles to be welded, to facilitate and make effective, the novel welding method of the present invention.

A further object of the invention is to provide in a predetermined sequence, novel means for and methods of handling steel plates, shaping the same to facilitate welding, and welding their side edge faces with unusually long, continuous welds.

A further object is to provide special apparatus and novel methods of welding steel plates which are positioned, relative to the apparatus, "on the floor" with the welding apparatus supported upon, and traveling along the plates or sheets to be welded.

Other and further objects and advantages of the invention will be apparent to those skilled in the art from a consideration of the following description of the specific embodiment of the invention shown in the accompanying drawing, in which:

Figure 1 is a diagrammatic plan lay-out of a plate handling and treating system.

Figure 2 is a diagrammatic plan view of a plurality of plates or sheets, butt-welded in end-to-end relation, and treated in accordance with the present invention for butt-welding along their side edge faces to a similar series of plates or sheets.

Figure 3 is a diagrammatic plan view on a larger scale showing a preferred manner of joining the plates along their side edge faces.

Figure 4 is an enlarged vertical transverse section, showing a preferred cross sectional shape of steel plate or sheet and diagrammatically illustrating the method of welding of the present invention.

Figure 5 is a similar view of the finished product, and

Figure 6 is a perspective view, somewhat diagrammatic in character, showing a welding apparatus.

Although the specific embodiment of the invention shown in the accompanying drawing and described below, relates to welding steel plates adapted to form the hull of a ship, it must be understood that the invention is not limited to such use. On the contrary, it is equally applicable to the welding of any desired articles, such as pipes, tubes, structural elements, boiler plate, miscellaneous sheet steel products, or the like. It must be understood, therefore, that the following description is illustrative of the invention and is not restrictive.

In the butt-welding art, it is often difficult, if not impossible, to apply welding current and converging pressure to both faces of both articles to be joined, along opposite sides of the joint between the articles. The present invention aims to apply welding current and converging pressure to one surface only of each plate, yet to make the flow of current through the joint between the plates start adjacent the opposite surface from that where the current is applied, and then progress transversely across the edge faces. To this end, each plate 10 is provided with grooves 11, 12, adjacent its edge faces 13 and 14, and the edge faces themselves are disposed on steeply inclined planes extending downwardly and outwardly from the grooved surfaces 15 to the opposite surfaces 16 and meeting the latter surfaces on acute angles 17. The grooves are defined by relatively steep walls 19 and bottom surfaces 20, normal thereto and meeting the upper surface 15 of the plate on relatively flat, obtuse angles 21. The edge faces 13, 14, and the grooves provide marginal upstanding ribs 22, 23.

In practicing the invention, steel sheets or plates, of a thickness of three-eighths of an inch and in the neighborhood of forty inches in width and thirty to forty feet in length, are removed from a suitable source of supply, such as a flat car 25 or the like. They are then conveyed to a conventional butt-welding machine, where their ends are butt-welded together, to produce an elongated strip 27, consisting of plates welded together in end to end relation. The strip is then fed through a forming mill, where their surfaces are grooved, as at 11, 12, and their edge faces inclined, as at 13, 14. This work may be done by any approved type of mill, by broaching, milling, or any other shaping or forming method.

The strip 28 so produced is laid upon a suitable support, such as a platform or the frame of a ship's hull, and a similar strip laid alongside thereof. From a point 30, substantially midway in the length of the strips, they are welded by a continuous welding method, first, from the point 30 toward one end, and then from that point toward the other end.

When the plates are laid together in edge to edge relation, the edge lines 31, at the lines of junction between the bottom surfaces 16 and the edge faces 13, 14, are brought into contact and an angular gap 32 exists between the adjacent edge faces. As indicated in Figure 4, electric welding electrode rollers 35, 36, mounted upon angularly disposed shafts 37, 38, engage the grooves 11, 12, in contact with the walls thereof. When welding current is passed from one electrode to the other, through the intervening metal of the plates, it must first pass through the line contact 31 at the bottom surfaces of the plates. Since the electrical resistance is greatest at that line, the edge faces adjacent thereto will be first to be raised to welding temperature. Converging pressure is applied from the electrodes to the surfaces of the grooves and to the back walls 19 of upstanding ribs 22, 23. Therefore, the plates are drawn together as the metal melts, and the localized area of welding moves transversely across the angularly disposed edge faces. Simultaneously with this action, the electrodes are moved longitudinally of the edge faces in the grooves 11, 12, thereby producing a continuous weld by a progressive movement of the welding zone both transversely and longitudinally of those edge faces.

This method makes certain that the plates are securely welded together at the surfaces opposite to the area of the application of welding current and of converging pressure, as the flow of welding current necessarily commences at that line of junction, due to the angular disposition of the edge faces. Thus, incipient lines of cleavage on the lower surfaces of the plates are entirely eliminated.

As shown in Figures 3 and 6, the electrode rollers 35, 36, mounted on shafts 37, 38, are preferably suspended from a transformer 39 mounted upon a car 40 having wheels 41 adapted to travel along the plates to be welded. Current may be conducted to the transformer by trolleys 42, 43, traveling along high tension lines 44, 45. As a result of this arrangement, the low voltage, high amperage welding current need traverse only an extremely short circuit, comprising the secondary of the transformer, the shafts 37, 38 and the electrode rollers. Converging pressure may be applied to one or both of the electrode rollers by an electromagnet 46 connected to one or both of the shafts, or by any other suitable means. The car supporting the transformer and the electrodes may be moved longitudinally of the plates by suitable cables 50, 51, or the like.

Grooved surfaces and electrode rollers of the type shown in Figure 4 are preferred for numerous reasons. For the sake of simplicity and cheapness of manufacture, it is desirable to have the grooves or other electrode pressure receiving surfaces formed within the thickness of the plates or other articles to be joined. Although it is possible, in some cases, to provide ribs projecting upwardly from the general plane of the upper surface of the articles, the formation of such ribs is ordinarily more expensive and difficult than the forming of grooves of the type shown herein.

The angular relation between the surfaces 19 and 20 of the grooves, relative to each other and to the upper surface 15, is of importance, since it permits the use of electrode rollers of relatively large diameter, thereby increasing the area of contact between the rollers and the surfaces 19 of the grooves, which reduces the temperature of the rollers and substantially prolongs their lives.

Instead of using electrode rollers of the type shown herein, it is entirely feasible to employ non-rotatable electrodes, of the type employed in "sewing machine" welders. In such case, the electrodes make a series of closely spaced, preferably overlapping, spot welds. The electrodes may be disposed in the grooves and bear against the surfaces 19 and 20 thereof in a manner that will be apparent to one skilled in the art.

Of course, instead of moving the electrodes, whether they be rollers or clamping electrodes, along the seam to be welded, the rollers may be mounted in fixed position and the work moved relative thereto. Such a method is contemplated, for instance, when making pipe sections having a welded side seam and when welding pipe sections end to end.

From the foregoing description, it will be seen that the invention provides a method of butt-welding plates and the like, progressively across and along the edge faces thereof, by the application of welding current and pressure to only one surface of each of the articles to be welded. The welding current and converging pressure are applied to the work against surfaces formed within the thickness of the work itself. Thus, access to the opposite surfaces of the articles is not necessary. In certain types of work, this system is of major importance and results in numerous advantages.

Also, the invention provides a novel form of sheet, plate or other article, having structural characteristics adapted to facilitate electric welding in an improved manner, these features comprising, the electrode receiving grooves or equivalent ribs and the angularly disposed edge faces adapted to be welded, progressively, transversely from one margin thereof to the other.

As stated above, the invention is not limited to the specific details of construction or specific method steps described above, but covers all similar constructions and methods, coming within the scope of the appended claims and their equivalents.

I claim:

1. The method of joining articles by electric butt-welding which comprises providing a groove in the surface of each article formed entirely within the thickness thereof and in closely spaced parallel relation to the edge face to be welded, inclining the edge faces relative to the surfaces of the article so that mutually facing edge faces of separate articles assembled for welding are inclined away from each other at an acute angle from a line of contact, conducting welding current from the surfaces of adjacent grooves in separate articles at a localized area through the articles and through the line contact between the edge faces, applying converging pressure to the grooves, to force the edge faces toward each other and to cause the weld to move progressively transversely across the edge faces, and continuously moving the localized area of welding current and of the application of converging pressure longitudinally of said edge faces, to produce a continuous weld.

2. The method of joining by electric butt-welding the adjacent edge faces of plates and the like, which comprises shaping the edge faces of the plates to cause the same to meet one of the surfaces of the plates at an acute angle, shaping the opposite surface of each plate to provide an upstanding rib terminating in the plane of the last-mentioned surface and paralleling the edge face and having a back wall spaced therefrom by the thickness of the rib, positioning the plates together with the lines of junction between the edge faces and the first-mentioned surfaces in contact, passing a welding current through the line of contact to initiate a weld at the plane of the first-mentioned surfaces, applying converging pressure to the back walls of said ribs to cause the weld to move transversely from the point of initiation progressively toward the second-mentioned surfaces, and continuously moving the area of the application of welding current and converging pressure longitudinally of the edge faces to weld the same progressively from end to end.

3. The method of electrically butt-welding a pair of plates or the like having their adjacent edge faces diverging transversely and having grooves in their surfaces formed entirely within the thickness of the plates and each defined by a bottom surface inclined with respect to the adjacent plate surface and meeting the same on a relatively flat obtuse angle, said grooves being adjacent to and paralleling the divergent margins of the edge faces, which comprises conducting welding current through the walls of the grooves of adjacent plates and through the line of contact between the edge faces to initiate welding at the point of contact of the edge faces and simultaneously applying converging pressure to the walls of said grooves, to cause the weld to move transversely across said edge faces toward the grooved surfaces of the plates, and continuously moving the area of welding current application and of the application of pressure longitudinally of the edge faces to form a continuous weld.

4. The method of electrically butt-welding a pair of plates or the like having their adjacent edge faces diverging transversely and having grooves in their surfaces formed entirely within the thickness of the plates and each defined by a bottom surface inclined with respect to the adjacent plate surface and meeting the same on a relatively flat obtuse angle and a side surface substantially normal with respect to the bottom surface, said grooves being adjacent to and paralleling the divergent margins of the edge faces, which comprises applying to the side surfaces of adjacent grooves welding wheel electrodes and thereby conducting current through the edge faces of the plates at their line of contact, applying converging pressure to the side surfaces of the grooves to cause said edge faces to converge and to cause the line of weld to move progressively transversely of said edge faces, and simultaneously and continuously moving the wheel electrodes longitudinally of said grooves and the edge faces to produce a continuous weld.

5. As an article of manufacture, a plate adapted to be butt-welded to a similar article, said plate having substantially parallel upper and lower surfaces and an inclined edge face meeting the lower surface in acute angular relation, the upper surface of the article having a groove therein, formed entirely within the thickness of the plate between said parallel surfaces and extending parallel to the edge face in closely spaced proximity behind the upper portion thereof and providing an upstanding rib defined by a substantially upright wall of the groove and by the upper portion of said edge face, said groove having a bottom wall disposed substantially normal to said upright wall and meeting the upper surface of the plate at an obtuse angle, said groove being adapted to receive a pressure applying electrode, whereby welding current and mechanical pressure are transmitted through said article along the line at the vertex of the acute angle between the edge face of the first-mentioned surface.

WARREN NOBLE.